(12) United States Patent
Stork et al.

(10) Patent No.: US 8,949,260 B2
(45) Date of Patent: Feb. 3, 2015

(54) METHOD AND APPARATUS FOR SECURE AND OBLIVIOUS DOCUMENT MATCHING

(75) Inventors: David G. Stork, Portola Valley, CA (US); Mohammed Shoaib, Princeton, NJ (US)

(73) Assignee: Ricoh Co., Ltd., Tokyo (JP)

( * ) Notice: Subject to any disclaimer, the term of this patent is extended or adjusted under 35 U.S.C. 154(b) by 707 days.

(21) Appl. No.: 12/576,943

(22) Filed: Oct. 9, 2009

(65) Prior Publication Data
US 2011/0087653 A1 Apr. 14, 2011

(51) Int. Cl.
| G06F 17/30 | (2006.01) |
| G06F 7/00 | (2006.01) |
| G06K 9/62 | (2006.01) |
| G06K 9/00 | (2006.01) |
| H04L 9/32 | (2006.01) |

(52) U.S. Cl.
CPC ........ G06K 9/6276 (2013.01); G06F 17/30011 (2013.01); G06K 9/00442 (2013.01); H04L 9/3218 (2013.01); H04L 2209/50 (2013.01); H04L 2209/605 (2013.01)
USPC ........................................... 707/758

(58) Field of Classification Search
USPC ................................. 707/723, 752
See application file for complete search history.

(56) References Cited

U.S. PATENT DOCUMENTS

| 6,363,381 | B1 | 3/2002 | Lee et al. | |
| 6,385,641 | B1 * | 5/2002 | Jiang et al. | 709/203 |
| 6,928,435 | B2 | 8/2005 | Lee et al. | |
| 7,136,530 | B2 * | 11/2006 | Lee et al. | 382/229 |
| 7,359,901 | B2 | 4/2008 | Lee et al. | |
| 8,037,035 | B2 * | 10/2011 | Kataoka et al. | 707/693 |
| 2002/0133623 | A1 * | 9/2002 | Lin et al. | 709/242 |
| 2005/0210080 | A1 * | 9/2005 | Saika | 707/204 |
| 2007/0041571 | A1 * | 2/2007 | Chatterjee et al. | 379/355.02 |
| 2007/0047782 | A1 * | 3/2007 | Hull et al. | 382/124 |
| 2007/0047816 | A1 * | 3/2007 | Graham et al. | 382/181 |
| 2007/0050411 | A1 * | 3/2007 | Hull et al. | 707/104.1 |
| 2009/0016615 | A1 * | 1/2009 | Hull et al. | 382/217 |
| 2009/0070415 | A1 * | 3/2009 | Kishi et al. | 709/203 |
| 2009/0268716 | A1 * | 10/2009 | Lamb et al. | 370/352 |

FOREIGN PATENT DOCUMENTS

EP 1662699 A1 5/2006

OTHER PUBLICATIONS

European Search Report for corresponding European Patent Application No. 10178131.8, Mar. 23, 2011, 10 pgs.

(Continued)

*Primary Examiner* — Kimberly Wilson
(74) *Attorney, Agent, or Firm* — Blakely, Sokoloff, Taylor & Zafman LLP (57) ABSTRACT

A method and apparatus for secure and oblivious document matching are described. In one embodiment, the method comprises transmitting initial secure dot product data generated from a document thumbprint for a document to a remote system. The method may also comprise receiving a response from the remote system. In one embodiment, the response is generated by the remote system utilizing the initial secure dot product data and without knowledge of the document. In one embodiment, the method may further comprise determining whether the response indicates a match for the document.

24 Claims, 6 Drawing Sheets

(56) References Cited

OTHER PUBLICATIONS

Jiang et al., "Similar Document Detection with Limited Information Disclosure", IEEE 24$^{th}$ International Conference on Data Engineering, Apr. 7, 2008, pp. 735-743, Piscataway, New Jersey, USA.

Pedersen, et al., "Impossibility of unconditionally secure scalar products", Data & Knowledge Engineering, Oct. 1, 2009, pp. 1059-1070, vol. 68, No. 10.

Malek et al., "Secure Dot-product Protocol Using Trace Functions", 2006 IEEE International Symposium on Information Theory, Jul. 1, 2006, pp. 927-931.

Kantarcioglu et al., "An Efficient Approximate Protocol for Privacy-Preserving Association Rule Mining", Advances in Knowledge Discovery and Data Mining : 13$^{th}$ Pacific-Asia Conference, Apr. 27, 2009, 10 pgs.

Amirbekyan et al., "The privacy of κ-NN retrieval for horizontal partitioned data—new methods and applications", 2007, pp. 32-42, vol. 63, New York, USA.

Murugesan et al., "Secure Content Validation", IEEE 23$^{rd}$ International Conference on Data Engineering Workshop, Apr. 1, 2007, pp. 157-162.

Stork, David G, "Secure and Oblivious Image-Key-Based Remote Document Database Matching: System and Protocols," Aug. 14, 2009, 8 pages.

\* cited by examiner

METHOD AND APPARATUS FOR SECURE AND OBLIVIOUS DOCUMENT MATCHING

FIELD OF THE INVENTION

The present invention relates to the field of document management; more particularly, the present invention relates to a system and method for secure and oblivious document matching.

BACKGROUND OF THE INVENTION

Consider a photocopier in a public library or a corporation, which is connected through a network to a remote database of target or "special" documents. Special documents may refer to copyrighted documents, secure documents, etc. The owner of the database therefore seeks to know if any user makes a photocopy of a document in that database, in order to charge a copyright fee, update copyright lists, enforce privacy policies, and so on. In order for this to occur, information about a document or the document itself would need to be transferred to the owner of the database. However, there are problems associated with this information exchange. First, the communications channel may not be secure, and thus a spy or snoop could intercept and gain access to the contents of the document. A solution to the first problem is transmitting the document via a secure communications channel, such as encrypting the document, as is well known in the art.

Although encryption of the document prevents an eavesdropper from discovering the contents of the transmitted document, the owner of the database is still given access to the contents of the document. That is, when the owner of the database receives the encrypted document, they will decrypt the document to determine if there is a match in the database. If there is no match, then the user has revealed the contents of their document unnecessarily. As such, the user has released potentially important information about the document being tested by the database owner.

SUMMARY OF THE INVENTION

A method and apparatus for secure and oblivious document matching are described. In one embodiment, the method comprises transmitting initial secure dot product data generated from a document thumbprint for a document to a remote system. The method may also comprise receiving a response from the remote system. In one embodiment, the response is generated by the remote system utilizing the initial secure dot product data and without knowledge of the document. In one embodiment, the method may further comprise determining whether the response indicates a match for the document.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method, apparatus, and article for secure and oblivious document matching are described. In one embodiment, initial secure dot product data generated from a document thumbprint for a document is transmitted to a remote system. A response is then received from the remote system that enables a determination of whether the document matches a document stored in the remote database. In one embodiment, the response is generated by the remote system utilizing the initial secure dot product data and without knowledge of the document. In one embodiment, as discussed in greater detail below, document matching utilizing the secure dot product ensures that the document matching is both secure and oblivious.

In one embodiment, a plurality of responses are received from the remote system. In one embodiment, secure dot product results are generated from the responses and the initial secure dot product data. In one embodiment, based on the secure dot product results, one of the responses received from the remote system indicates a match for the document.

In one embodiment, the initial dot product data is computed from the document thumbprint and one or more random parameters. In one embodiment, the document thumbprint includes mixed-media reality (MMR) bounding box codes corresponding to one or more visual features extracted from the document. Furthermore, the one or more random parameters are random parameters are random parameters generated for a secure dot product process.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

A system and protocol for matching a user's document D against another party's documents stored in a remote database are described. In one embodiment, the document matching is both secure and oblivious. In one embodiment, the communication of data for document matching between a client and remote system is secure because the information is transmitted over a secure communications channel to prevent an eavesdropper from learning the contents of the transmission. In one embodiment, the communications channel is secured utilizing encryption techniques such as symmetric key cryptosystems, public key cryptosystems, as well as other cryptosystems. Although the communication itself is secured, when the remote database owner decrypts a communication, they become aware of the contents of the transmission.

In order to prevent releasing potentially sensitive information to the remote database owners, in one embodiment, the systems and protocols discussed herein also provide oblivious document matching. As will be discussed in greater detail below, the document matching is considered oblivious because the remote database owner that receives a transmission, processes a document query, etc. performs each task while never learning anything about the contents of D. In one embodiment, to prevent the remote database owner from learning the contents of the document, document thumbprints are utilized for the document matching discussed herein. In one embodiment, as discussed in greater detail below, a document thumbprint is composed of data that uniquely identifies a document, but does not contain or reveal data about the contents (e.g. content information) of the document.

In one embodiment, after a document D matches a document in a database of a remote system, the remote system is informed of the match and thereby informed of the corresponding document in the remote database. If, however, D matches no documents in the database of the remote system, the oblivious methods and system discussed herein ensure that the remote system learns nothing about the content of D.

Figure 1:
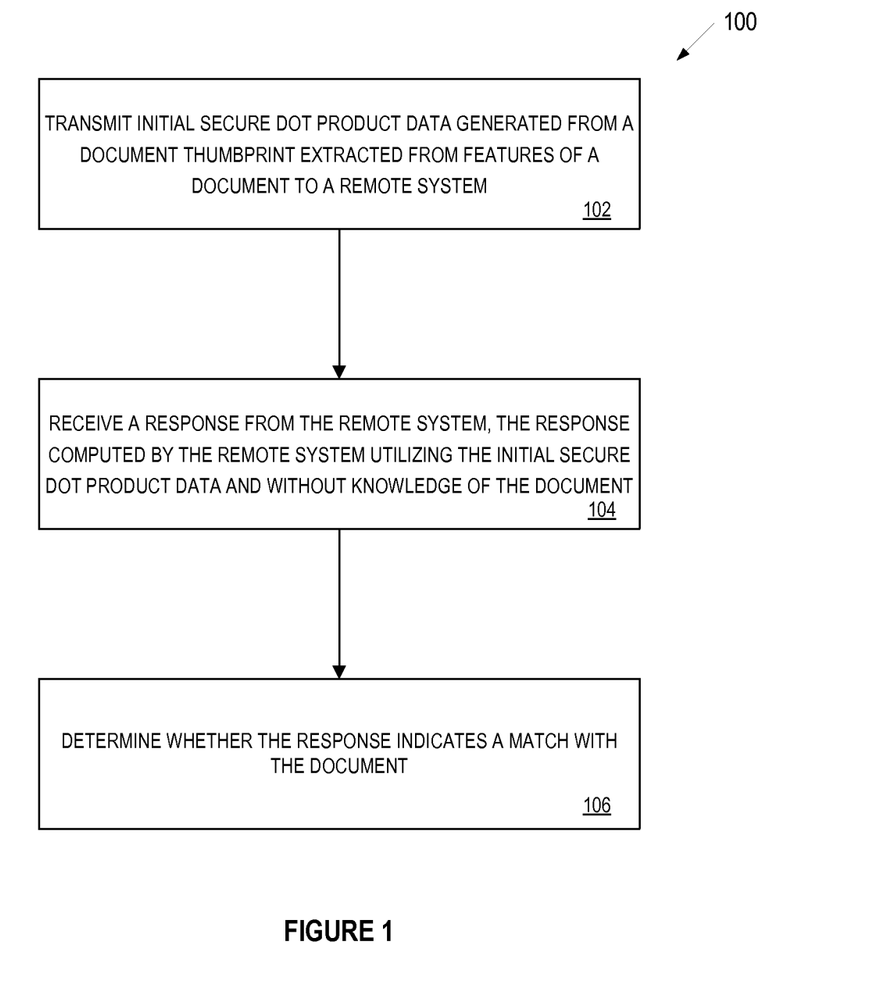
FIG. 1 is a flow diagram of one embodiment of a process for secure and oblivious document matching.

FIG. 1 is a flow diagram of one embodiment of a process 100 for performing secure and oblivious document matching. The process is performed by processing logic that may comprise hardware (circuitry, dedicated logic, etc.), software (such as is run on a general purpose computer system or a dedicated machine), or a combination of both.

Referring to FIG. 1, the process begins by processing logic transmitting initial secure dot product data generated from a document thumbprint extracted from features of a document to a remote system (processing block 102). In one embodiment, a document refers to scanned images, printed text, digital photographs, fingerprint scans, etc.

In one embodiment, the document thumbprint is extracted from an image of a document by a local or client system, such as a photocopier. In one embodiment, a set of mixed media reality (MMR) bounding box codes or other visual features are extracted from a document and a unique identifier (i.e., the document thumbprint) is constructed for the document. In one embodiment, document feature extraction and MMR based document matching that may be used are described more fully in U.S. Pat. No. 6,363,381, entitled "Compressed Document Matching," filed Nov. 3, 1998 and U.S. Patent Publication Number US 2009/0016615 A1, entitled "Invisible Junction Feature Recognition for Document Security or Annotation," filed Mar. 31, 2008, both of which are incorporated herein by reference. Other visual feature extraction systems, such fingerprinting feature extraction, face recognition feature extraction, iris detection feature extraction, retina detection feature extraction, scale-invariant feature transform feature (SIFT) extraction, etc. may also be utilized as discussed herein.

In one embodiment, discussed in greater detail below, a document thumbprint is generated from the document. In one embodiment, initial secure dot product computations are performed on the document thumbprint prior to transmission to ensure that document matching is performed in an oblivious manner. However, other mechanisms may be utilized for secure and oblivious document matching, such as secure string matching. In one embodiment, processing logic transmits the initial dot product data to the remote system via a secure communications channel, such as by encrypting the secure key prior to transmission.

Processing logic receives a response from the remote system, where the response has been computed utilizing the initial secure dot product data and without knowledge of the document (processing block 104). In one embodiment, prior to receiving the response, the remote system is initialized with its own set of document thumbprints, which have been extracted from features of a plurality of documents, similar to that discussed above with respect to the client system. The document thumbprints are then indexed and stored in a database maintained by the remote system.

In a preferred embodiment, additional secure dot product computations are utilized to generate the response via a secure dot product computation utilizing the initial dot product data and one of the document thumbprints stored at the remote system. Because the response is based on the initial dot product data and a document thumbprint of the remote system, neither of which includes information about the actual contents of the documents themselves, neither the remote system nor the client system are provided with potentially sensitive material related to the document.

Processing logic then determines whether the response indicates a match with the document (processing block 106). In one embodiment, the response is subject to final dot product computations at the client system that transmitted the initial dot product data to the remote system. In one embodiment, the dot product is an operation which takes two vectors over the real numbers R and returns a real-valued scalar quantity. Given two vectors, $\vec{x}=(x_1,x_2,\ldots,x_n)$, and $\vec{y}=(y_1,y_2,\ldots,y_n)$, the output scalar value of the dot product is:

$$\vec{x}\cdot\vec{y} = (x_1, x_2, \ldots, x_n)\cdot(y_1, y_2, \ldots, y_n) = \sum_{i=1}^{n} x_i y_i$$

As will be discussed in greater detail below, processing logic performs secure dot product calculations using data known only to processing logic of the client system, as well as data received from the remote system. The dot product calculations are referred to as secure because the two parties (i.e., the client system and remote system) jointly compute data for the final dot product calculations while maintaining privacy. One example of a secure dot-product protocol using trace functions that may be used is described in Malek & Mirir, *Secure Dot-Product Protocol Using Trace Functions*, Proceedings of ISIT, pages 927-931, 2006.

In one embodiment, processing logic utilizes the scalar quantity result of the secure dot product computations for comparison with a threshold value. In one embodiment, the threshold varies depending on the number of potential matching documents, the matching application, closeness of content of potential matching documents, etc. In one embodiment, a threshold T may be defined as a scalar value such that $\langle \vec{x}, \vec{y}_i \rangle \geq T$ for only one document $D_i$ in a set of potential matching documents. When the result exceeds a threshold, processing logic has determined that the document utilized to generate the query document thumbprint matches the document associated with the document thumbprint utilized by the remote system in generating the response.

In one embodiment, data indicative of the match may thereafter be transmitted to the remote system to enable the remote system to perform various post-match processes. For example, the remote system may be configured to perform copyright tracking, payment of royalties, perform data loss prevention actions, etc. in response to a detected match.

Secure and Oblivious Document Matching

Figure 2:
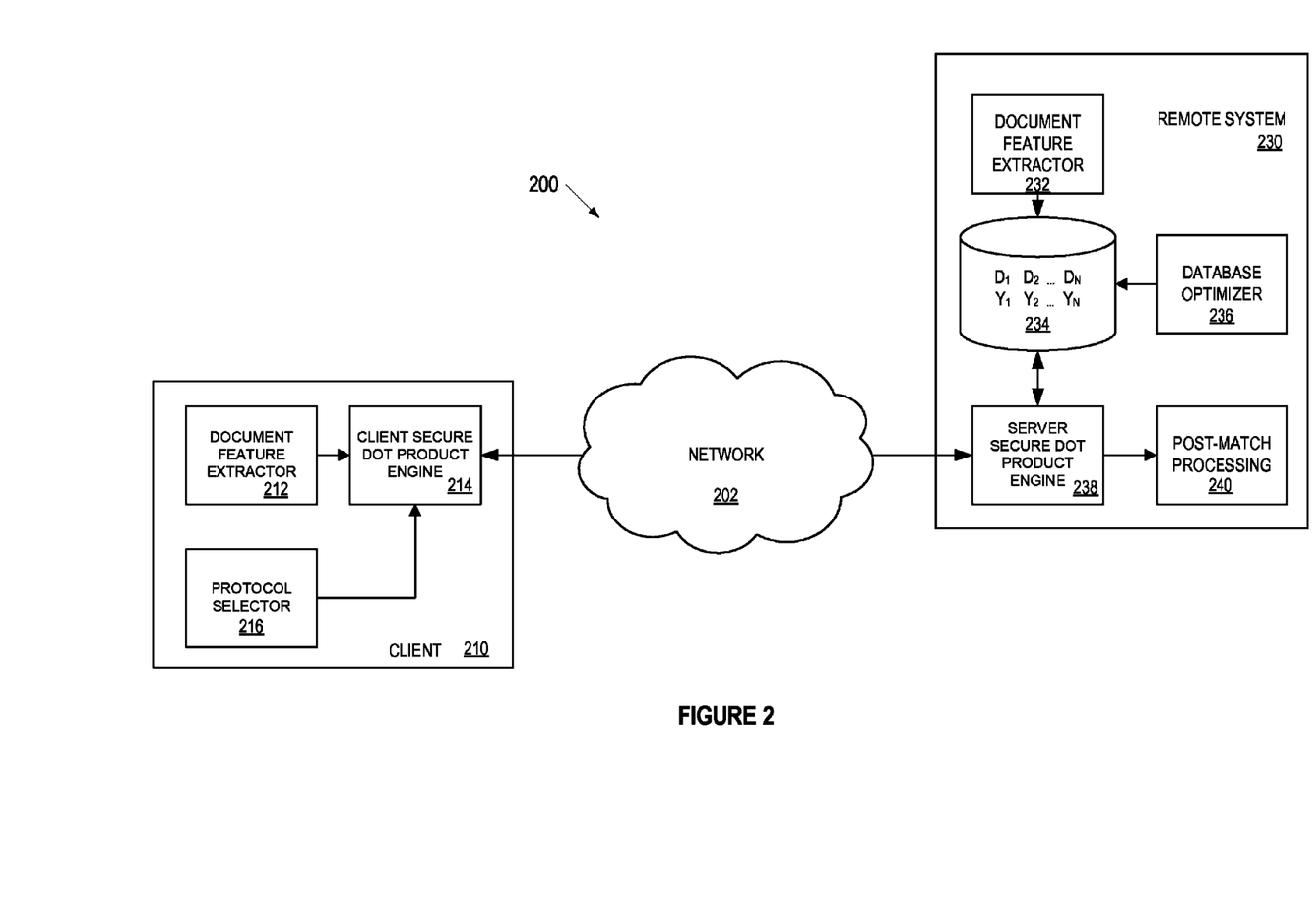
FIG. 2 illustrates one embodiment of system for secure and oblivious document matching.

FIG. 2 illustrates one embodiment of system 200 for secure and oblivious document matching in which embodiments of the present invention may operate. In one embodiment, the system exploits the MMR document thumbprint extraction methods discussed above. Furthermore, the system utilizes a distributed secure dot-product protocol using trace functions, as well as document database search strategies based on statistical principles to achieve the lowest possible computational and communication complexity.

In one embodiment, the system includes a client 210 coupled to a communications network 202 such as a public network (e.g., the Internet, a wireless network, etc.), a private network (e.g., LAN, Intranet, etc.), or a combination of public and private networks. The client system 210 communicates with remote system 230 via the network 202 to perform secure and oblivious document matching.

In one embodiment, remote system 230 is a remote server that provides copyright accounting functions, photo identification services, fingerprint matching, etc. In one embodiment, remote system 230 includes a secure database 234 that stores a plurality of documents as well as associated document thumbprints. In one embodiment, document feature extractor 232 accesses database 234, and for each document $D_1 \ldots D_N$ stored in the database, creates corresponding MMR word-box codes or document thumbprints $Y_1 \ldots Y_N$. In one embodiment, document feature extractor creates MMR thumbprints $Y_1 \ldots Y_N$ as discussed in U.S. Pat. No. 6,363,381, entitled "Compressed Document Matching," filed Nov. 3, 1998 and U.S. Patent Publication Number US 2009/0016615 A1, entitled "Invisible Junction Feature Recognition for Document Security or Annotation," filed Mar. 31, 2008. In one embodiment, document feature extractor 232 need only create the MMR document thumbprint once for each document (including as new documents are added to the database 234).

In one embodiment, database optimizer 236 orders the documents and document thumbprints stored in database 234 to improve the computational performance of subsequent document matching. In one embodiment, as discussed below, document matching may be an iterative process utilizing a top down approach. Thus, in one embodiment, database optimizer 236 orders the documents and document thumbprints in database 234 according to a probability that a document will be copied by client 210, according to an order of importance, based on prior access records, etc. Other orderings may also be used by database optimizer 236. Note that ordering the document is optional and may not be performed.

In one embodiment, client 210 may be a photocopier, multifunction peripheral (MFP) device, printer, scanner, or any other device utilized to capture or print documents. In one embodiment, document feature extractor 212 locally performs image processing to extract word bounding boxes and the MMR document thumbprint for document X. In one embodiment, document feature extractor 212 generates the MMR document thumbprint K(X) in response to client 210 scanning the document, printing the document, etc.

In one embodiment, document thumbprint K(X) is based on MMR bounding box features and expressed as a vector. Client secure dot product engine 214 uses secure oblivious transfer protocols to implement a secure dot product of K(X) with each of the documents (i.e., $D_1 \ldots D_N$) in database 234 of remote system 230. In one embodiment, dot product computations are performed at the remote system 230 as well as client 210. In other embodiments, other secure and oblivious protocols may be utilized consistent with the teachings herein. For example, an alternative method includes secure string matching.

In one embodiment, utilizing the secure dot-product protocol using trace functions developed by Malek & Miri, document thumbprint $K(\vec{X})=(x_1, x_2, \ldots, x_n)$. In one embodiment, the document thumbprint is a vector of MMR bounding box codes extracted from document X by document feature extractor 212 in response to client 210 acquiring a document image (i.e., printing a document, scanning a document, scanning a fingerprint, etc.). Furthermore, database 234 stores a number of document thumbprints, where document thumbprint k is $\vec{Y}_k = (y_1, y_2, \ldots, y_n)$.

In order to perform the secure dot product, for $A = (\alpha_1, \alpha_2, \ldots, \alpha_n)$, a basis of $F_{p^n}$ the n-dimensional extension of a finite field $F_p$ with characteristic p, and $B = (\beta_1, \beta_2, \ldots, \beta_n)$ is its dual basis. $\vec{X}$ and $\vec{Y}_k$ can both be mapped to $X \in F_{p^n}$ and $Y \in F_{p^n}$, respectively.

Client secure dot product engine 214 randomly selects $g \in F_{p^n}$ and a, b, c, $d \in F_p$. In one embodiment, ab−bc≠0. The client then computes initial dot product data $\{U, V\}$:

$$U = a\vec{X} + bg$$

$$V = c\vec{X} + dg$$

which client 210 transmits to remote system 230 via network 202.

For each document thumbprint, $\vec{Y}_k$, stored in database 234 at the remote system 230, the server secure dot product engine 238 generates:

$$\vec{Y}_k U = \vec{Y}_k (a\vec{X} + bg)$$

$$\vec{Y}_k V = \vec{Y}_k (c\vec{X} + dg)$$

The server secure dot product engine 238 then computes trace functions of $\vec{Y}_k U$ and $\vec{Y}_k V$, and returns $\{T(YU), T(YV)\}$ to the client 210 via network 202. In one embodiment, the trace function can be defined as a linear mapping from $F_{p^n}$ to $F_p^m$ where m divides n. Furthermore, the trace function can be used in computing the dot product of $\vec{X}$ and $\vec{Y}_k$ as:

$$\vec{X} \cdot \vec{Y}_k = T(XY) \bmod p$$
$$= (ab - bc)^{-1}(dT(\vec{Y}_k U) - bT(\vec{Y}_k V)) = X^t Y_k$$

The client secure dot product engine 214 computes $(ab-bc)^{-1}(dT(\vec{Y}_k U) - bT(\vec{Y}_k V))$, which equals $X^t Y_k$ (i.e., the dot product $\vec{X} \cdot \vec{Y}_k$) and determines whether $X^t Y >$ threshold. When the scalar value of the dot product exceeds the threshold, client secure dot product engine has found a match between document X and $Y_k$.

In one embodiment, client 210 assesses matches of document D with documents $D_1 \ldots D_N$ in database 234 using the dot product result as discussed above. In one embodiment, when the remote system 230 contains the exact matching document or document thumbprint, the dot product value $X^t Y_k$ would be equal to twice the original transmitted initial secure dot product data. However, if the dot product is less than that, a confidence factor m could be used to assess close and probable matches.

In one embodiment, after a match is detected, client secure dot product engine 214 transmits the corresponding index k to remote system 230 to inform the remote system of the match. In one embodiment, post match processing 240 performs copyright tracking for document $D_k$, determines and enforces data loss prevention rules with respect to $D_k$, etc.

In one embodiment, once client secure dot product engine 214 detects an adequate, or the best, match between the document and a document in database 234, client 210 terminates the matching process and deletes K(X) from a memory (not shown) of client 210.

As discussed above, in one embodiment, the search through documents $D_1 \ldots D_N$ involves secure dot product computations at both client 210 and remote system 230. In one embodiment, the search pattern of documents $D_1 \ldots D_N$ in database 234 is sequential through the database 234, and database optimizer 236 organizes documents within database 234 to improve computational efficiency and document matching. In one embodiment, documents $D_1 \ldots D_N$ are ordered by descending probability of occurrence. Under simple and plausible assumptions, this form of pre-ordering can save 20% computation during document matching. In one embodiment, database optimizer 236 performs different or combined ordering schemes, such as arranging documents $D_1 \ldots D_N$ based on an order of importance, cost, etc. Database optimization for secure and oblivious matching is discussed further below.

In one embodiment, client 210 further includes a protocol selector 216 coupled with client secure dot product engine 214. Protocol selector 216 enables client 210 to select, automatically or by a user, parameters the impact computation efficiency and/or probability of finding a successful match. In one embodiment, protocol selector 216 may inform remote system 230 of a maximum number of matches client is to receive, a total time client is willing to receive potential matches, a preferred time the client desires to receive potential matches, the size of a document thumbprint to use, the size of space $F_p$, selection of only a specific group of documents such as highly probable or important documents, selection of a hierarchical matching scheme such as important documents before less important documents, etc.

Figure 3A:
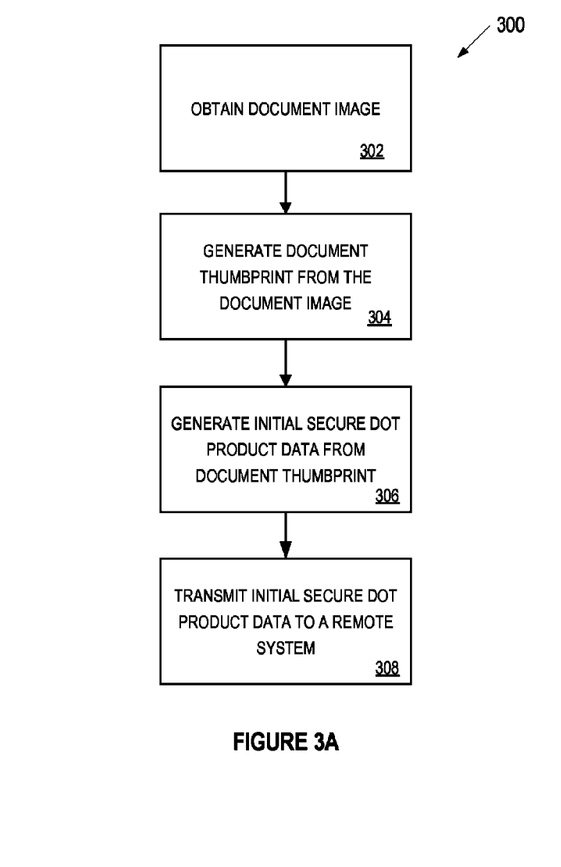
FIG. 3A is a flow diagram of one embodiment of a process for generating and transmitting data for document matching.

FIG. 3A is a flow diagram of one embodiment of a process 300 for generating and transmitting data for document matching. The process is performed by processing logic that may comprise hardware (circuitry, dedicated logic, etc.), software (such as is run on a general purpose computer system or a dedicated machine), or a combination of both. In one embodiment, process 300 is performed by a client system, such as client 210 of FIG. 2.

Referring to FIG. 3A, the process begins by processing logic obtaining a document image (processing block 302). In one embodiment, the image is obtained when a client system photocopies an image, prints an image, scans a fingerprint, performs an iris scan, captures an image of a face, loads a digital photograph, or captures any other image to be matched.

Processing logic generates a document thumbprint K(X) from the document image (processing block 304). In one embodiment, the document thumbprint K(X) includes MMR document codes extracted from visual features of an image of the document, such as MMR word-box codes. However, other document thumbprint based on features of the document may also be utilized. In one embodiment, K(X) is represented as a vector of varying lengths based on a selected protocol, required security level, etc. As the number of values in the vector K(X) increases, the security level associated with the secure and oblivious document matching increases. However, as the size of K(X) increases, computation cost also increases.

Processing logic then utilizes the document thumbprint to compute an initial secure dot product data for use in a secure dot product matching process (processing block 306). In one embodiment, as discussed above, processing logic calculates $\{U, V\}$.

Processing logic then transmits the initial secure dot product data to a remote system (processing block 308). In one embodiment, the initial secure dot product data is encrypted prior to transmission. In another embodiment, the initial secure dot product data is transmitted in unencrypted form.

Figure 3B:
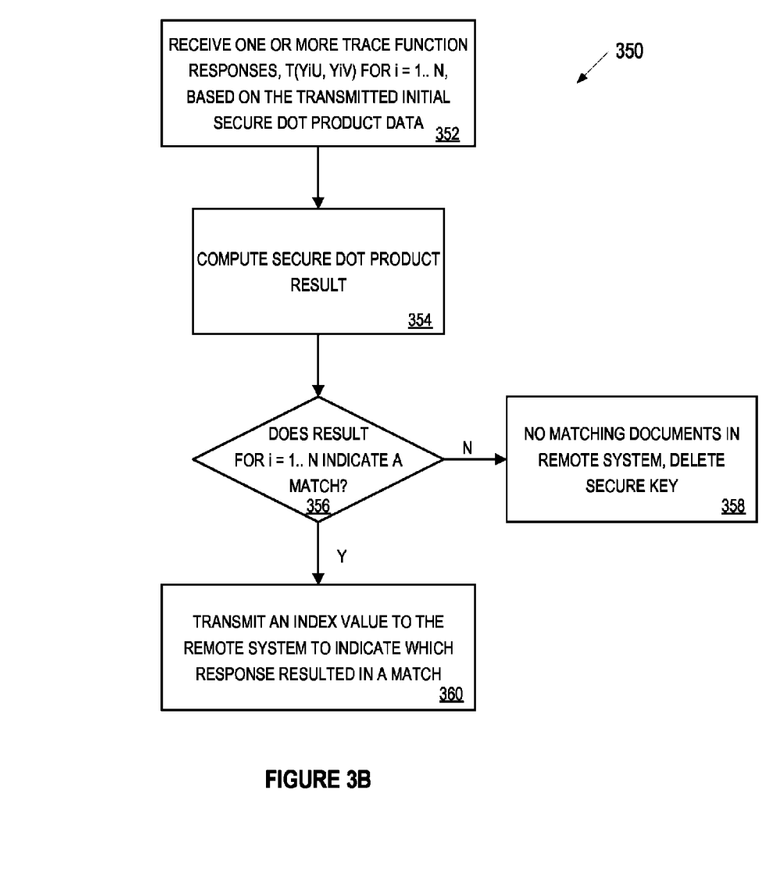
FIG. 3B is a flow diagram of one embodiment of a process for performing document matching.

FIG. 3B is a flow diagram of one embodiment of a process 350 for performing document matching. The process is performed by processing logic that may comprise hardware (circuitry, dedicated logic, etc.), software (such as is run on a general purpose computer system or a dedicated machine), or a combination of both. In one embodiment, process 350 is performed by a client system, such as client 210 of FIG. 2.

Referring to FIG. 3B, the process begins by processing logic receiving one or more trace function responses based on transmitted initial secure dot product data (processing block 352). In one embodiment, processing logic receives a series of responses corresponding to documents 1 . . . N stored by a remote system. In one embodiment, each trace function response is based on the transmitted initial secure dot product data discussed in FIG. 3A above, as well as a document key that is associated with a document stored on a remote system. For ease of discussion, the remainder of FIG. 3A will simply refer to response $T(Y_iU, Y_iV)$) as referring to the $i^{th}$ response and corresponding to the $i^{th}$ document stored at a remote system.

Processing logic computes the secure dot product result utilizing the received response (processing block 354). In one embodiment, processing logic computes $(ab-bc)^{-1}(dT(Y_iU)-bT(Y_iV))=X'Y_i$, where a, b, c, and d were randomly selected when generating the original secure key.

Processing logic determines whether $X'Y_i$ indicates a match (processing block 356). In one embodiment, the scalar value of $X'Y_i$ indicates a match when the value exceeds a threshold. In another embodiment, a match is found when $X'Y_i$ is within the confidence interval m of the threshold. When a match is found, processing logic transmits an index value to the remote system to indicate which response resulted in a match (processing block 360). In one embodiment, the index value indicates to the remote system, the document thumbprint utilized by the remote system (e.g., document thumbprint $Y_i$ corresponding to $D_i$) to generate the matching response.

However, when the scalar value $X'Y_i$ does not exceed the threshold, or alternatively is not within a confidence interval m of the threshold, processing logic determines that there is no matching document at the remote system and deletes the initial secure dot product data and corresponding document thumbprint from memory (processing block 358).

Thus, the processes discussed above, with respect to FIGS. 3A and 3B enable a client system to locally perform secure and oblivious document matching, without revealing the contents of a document to be matched to a remote system. Furthermore, the remote system provides the responses to the client in the same secure and oblivious manner.

Figure 4:
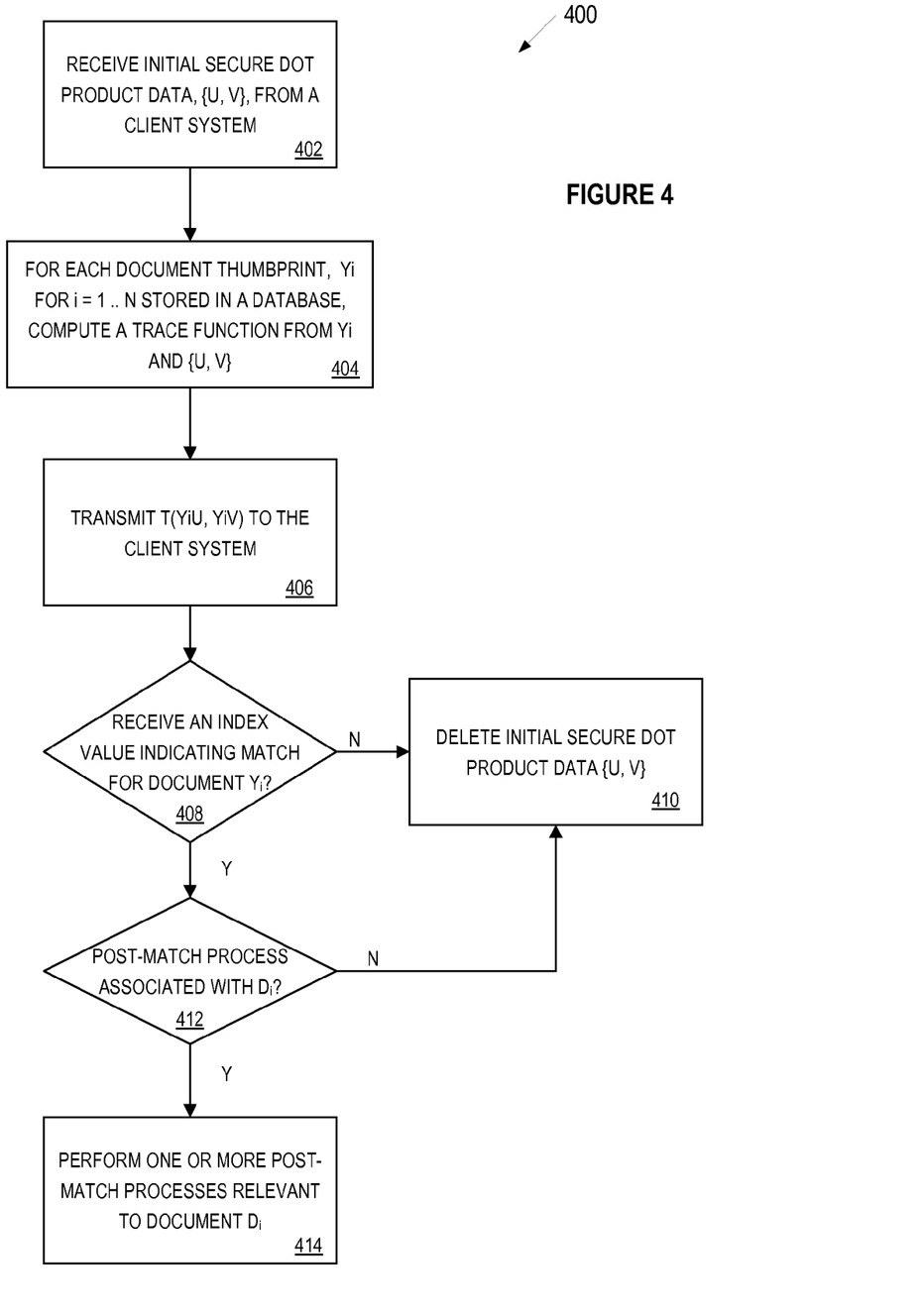
FIG. 4 is a flow diagram of one embodiment of a process for generating data at a remote system for document matching.

FIG. 4 is a flow diagram of one embodiment of a process 400 for generating data at a remote system for document matching. The process is performed by processing logic that may comprise hardware (circuitry, dedicated logic, etc.), software (such as is run on a general purpose computer system or a dedicated machine), or a combination of both. In one embodiment, process 400 is performed by a data storage and management system, such as remote system 230 of FIG. 2.

Referring to FIG. 4, the process begins by processing logic receiving initial secure dot product data {U,V} from a client system (processing block 402). In one embodiment, the initial secure dot product data has been generated from a document image, digital photograph, fingerprint scan, etc. However, the initial secure dot product data {U, V} does not reveal anything about the contents of the document itself. Thus, processing logic proceeds, as discussed below, oblivious to the content of the document to be matched.

For each document thumbprint, $Y_i$ for i=1 . . . N stored in a database coupled with processing logic, processing logic computes a trace function from $Y_i$ and {U, V} (processing block 404), and transmits a response of $\{T(Y_iU), T(Y_iV)\}$ to the client system (processing block 406). In one embodiment, each response $\{T(Y_iU), T(Y_iV)\}$ corresponds to document $D_i$, from which Yi was generated. However, as discussed above, by utilizing the document thumbprints and the secure dot product process, nothing is revealed to the client system about the contents of $D_i$ by the response of $\{T(Y_iU), T(Y_iV)\}$.

Processing logic waits to receive an indication that a match has occurred. In one embodiment, processing logic waits to receive an index value from the client system (processing block 408). When processing logic receives an index, for example i, processing logic is informed that document $D_i$ associated with document thumbprint $Y_i$ has been matched. In response to receiving data indicative of the match, processing logic further determine if there is a post match process associated with $D_i$ (processing block 412).

When a process is associated with a matched document, processing logic executes the one or more post match processes relevant to $D_i$ (processing block 414). As discussed above, the document matching process may be initiated when a client system, such as a photocopier, attempts to capture or scan a document. In one embodiment, when a match is found, the post match processing of processing block 414 determines how the match should be handled. For example, if a client system is photocopying a copyright protected document, the post-match processes may include tracking the use of the copyrighted mater or charging a royalty. As another example, the match may indicate that a private document is being copied without permission. Thus, post match processing may include triggering one or more data loss prevention events such as sending an alert message to a third party. Other post match processes may be utilized consistent with the discussion herein.

However, if no match is found or no post-match processes are associated with document Di, processing logic deletes the initial dot product data {U, V} from a memory (processing block 410).

Figure 5:
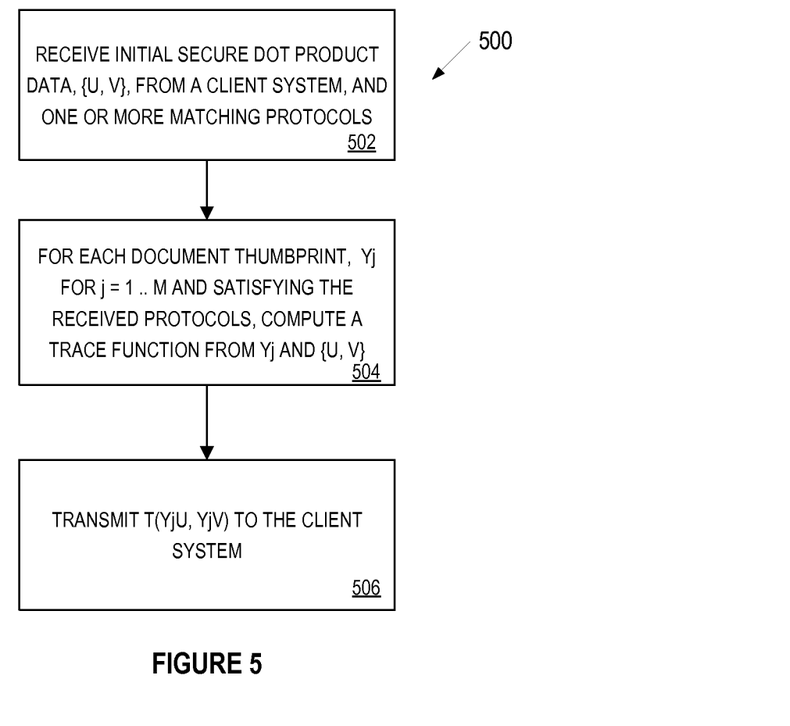
FIG. 5 is a flow diagram of one embodiment of a process for generating data at a remote system for document matching according to varying matching protocols.

FIG. 5 is a flow diagram of one embodiment of a process 500 for generating data at a remote system for document matching according to varying matching protocols. The process is performed by processing logic that may comprise hardware (circuitry, dedicated logic, etc.), software (such as is run on a general purpose computer system or a dedicated machine), or a combination of both. In one embodiment, process 500 is performed by a data storage and management system, such as remote system 230 of FIG. 2.

Referring to FIG. 5, the process begins by processing logic receiving initial secure dot product data {U,V} from a client system, as well as one or more matching protocols (processing block 502). As discussed above, a client system may set certain parameters for document matching, such as a maximum number of desired responses, a time at which to send responses, an instruction to provide a hierarchy of responses (i.e., important document matching responses before non-important document matching responses), etc.

Based on the received protocol(s), processing logic computes a trace function from $Y_j$ and {U, V} for document thumbprints $Y_{j=1 \ldots M}$ an documents $D_1 \ldots D_M$ satisfying the specified protocols (processing block 504). Processing logic then transmits the responses to the client system (processing block 506) for processing as discussed above with respect to FIG. 3B.

Database Optimization for Document Matching

As discussed above, document matching utilizing document thumbprints and secure dot product processes enables secure and oblivious document matching abilities. As the size of the document thumbprints used for matching are increased, the security associated with the matching processes also increases, but to the detriment of computational efficiency. Thus, reducing document thumbprint size is one approach to reducing computational complexity, but at the expense of security. However, optimizing a database of potential matching documents and document thumbprints is another approach to reducing computational complexity, for secure and oblivious document matching, without reducing the associated levels of security.

Figure 6:
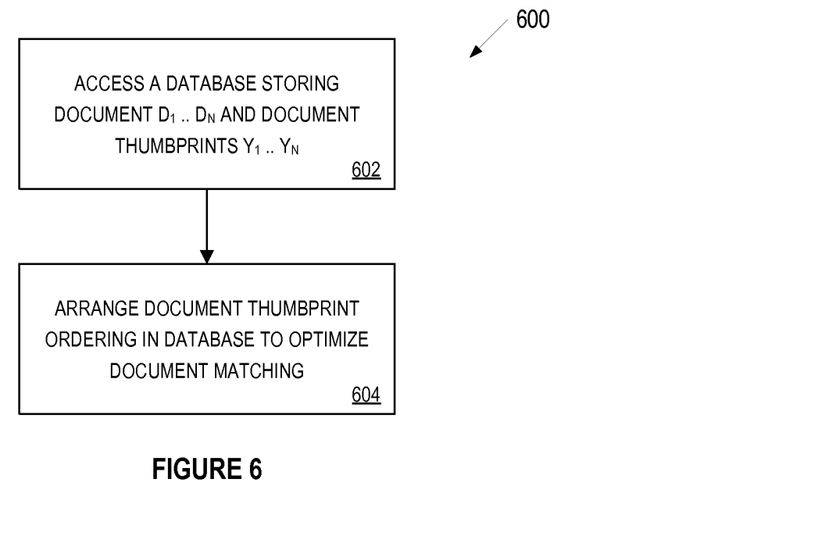
FIG. 6 is a flow diagram of one embodiment of a process for secure and oblivious document matching.

FIG. 6 is a flow diagram of one embodiment of a process 600 for optimizing a database for secure and oblivious document matching. The process is performed by processing logic that may comprise hardware (circuitry, dedicated logic, etc.), software (such as is run on a general purpose computer system or a dedicated machine), or a combination of both. In one embodiment, process 600 is performed by a database optimizer, such as that discussed above with respect to FIG. 2.

Referring to FIG. 6, the process begins by processing logic accessing a database storing documents $D_1 \ldots D_N$ and corresponding document thumbprints $Y_i \ldots Y_N$ (processing block 602). Processing logic then arranges the document thumbprint ordering in the database for document matching (processing block 604).

There are a number of parameters and options that allow processing logic to accommodate limitations in computation and communication bandwidth. In one embodiment, processing logic may organize documents based on an importance value associated with a document. For example, documents that are associated with high royalties, those subject to contract, or documents classified as confidential, may be placed higher in a document thumbprint ordering. Conversely, documents that are highly unlikely to be copies, such as an archaic text, may be placed lower in a document thumbprint ordering.

Additional Matching Optimizations

As discussed above, protocol selection and database ordering are approaches to satisfying user preferences, as well as providing document matching without sacrificing security. The embodiments discussed herein may also employ one or more of the following techniques.

In one embodiment, a remote system may randomly poll documents stored by the remote system for document matching. In one embodiment, the documents are polled with a probability p ($0<p \leq 1$). Although random document polling avoids the need to test every document, there is an attendant loss in recognition of some documents (i.e., a match failure when in fact a matching document at the remote system existed). However, randomly polling documents for matching does not result in a loss of security.

In another embodiment, the pool size of potential documents/thumbprints that are to be tested for matching may also be adjusted. That is, instead of utilizing a database that includes 10,000 documents, a database owner can adjust the number to 1,000 thereby reducing the total number of matching probabilities and computations. Although a document match may be missed, if a document and associated document thumbprint are removed from a matching pool, there is no loss of security. Furthermore, a database owner may automatically adjust the size of a document matching pool based on current usage, time of day, client subscription options, etc.

For example, if documents are copied frequently at noon in a library, but infrequently at 6:00 pm, then a smaller number of documents can be matched at noon. Furthermore, the entire transmission and protocol invokements discussed herein can be delayed, for instance to after the library has closed and the photocopying usage drops to zero.

Secure and Oblivious Document Matching Applications

For document matching it is desirable, from a user's perspective, to maintain information about a document, including its key, secret, even from the owner of a matching system and database. Embodiments of the invention discussed above achieve this ideal. Namely a client system and remote system may check for document matches. In the case of a match, the remote system can be informed the user's document, and thus knows the specific content. However, in the case of a nonmatch, where a user's document not in the database, the owner of the database learns essentially nothing about the user's document, not even its document thumbprint.

There are many applications for such a system and functionality. For instance, consider a database of fingerprints of criminals in a law enforcement database. Suppose a person is digitally fingerprinted when entering a secure facility. The government may have the right to check if anyone entering the facility is a criminal, and attempt to match the fingerprint with their database. But if the person is not a criminal, that person may not want to reveal his fingerprint information to anyone, including the government.

Corporate document security is another example where secure and oblivious document matching would be useful. A company would want to ensure that employees are not copying secure and/or sensitive documents. Similarly, employees may not want their company to know the contents of personal documents. Because the secure and oblivious document matching techniques, discussed above, do not reveal the contents of a document until it is matched, a corporation could enforce security and data lost prevention protocols, without intrusion into the privacy of their employees.

An Example of a Computer System

Figure 7:
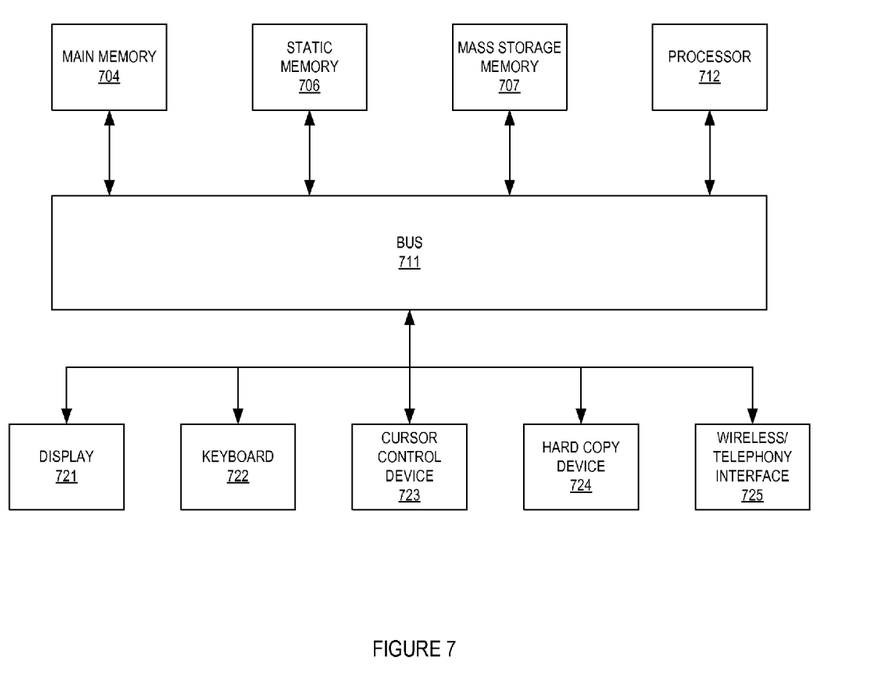
FIG. 7 is a block diagram of a computer system that may perform one or more of the operations described herein.

FIG. 7 is a block diagram of a computer system that may perform one or more of the operations described herein. Referring to FIG. 7, computer system 700 may comprise an exemplary client or a server computer system. Computer system 700 comprises a communication mechanism or bus 711 for communicating information, and a processor 712 coupled with bus 711 for processing information. Processor 712 includes a microprocessor, but is not limited to a microprocessor, such as, for example, Pentium™, etc.

System 700 further comprises a random access memory (RAM), or other dynamic storage device 104 (referred to as main memory) coupled to bus 711 for storing information and instructions to be executed by processor 712. Main memory 704 also may be used for storing temporary variables or other intermediate information during execution of instructions by processor 712.

Computer system 700 also comprises a read only memory (ROM) and/or other static storage device 706 coupled to bus 711 for storing static information and instructions for processor 712, and a data storage device 707, such as a magnetic disk or optical disk and its corresponding disk drive. Data storage device 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device 722, including alphanumeric and other keys, may also be coupled to bus 711 for communicating information and command selections to processor 712. An additional user input device is cursor control 723, such as a mouse, trackball, trackpad, stylus, or cursor direction keys, coupled to bus 711 for communicating direction information and command selections to processor 712, and for controlling cursor movement on display 721.

Another device that may be coupled to bus 711 is hard copy device 724, which may be used for printing instructions, data, or other information on a medium such as paper, film, or similar types of media. Furthermore, a sound recording and playback device, such as a speaker and/or microphone may optionally be coupled to bus 711 for audio interfacing with computer system 700. Another device that may be coupled to bus 711 is a wired/wireless communication capability 725 to communication to a phone or handheld palm device.

Note that any or all of the components of system 700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    transmitting one or more secure dot product matching protocols and initial secure dot product data generated from a document thumbprint for a document to a remote system, wherein the initial secure dot product data is a secure key computed from one or more mixed-media bounding box codes corresponding to one or more visual features extracted from the document and one or more random parameters generated for a secure dot product process, and wherein the one or more secure dot product matching protocols adjust one or more of the one or more random parameters for document matching, and a first secure dot product matching protocol transmitted to the remote system with the initial secure dot product data is selected by a client to reduce a size of the secure key from an initial size to a reduced size;
    receiving a response from the remote system, the response generated by the remote system utilizing the initial secure dot product data and without knowledge of the document, the response generated by the remote system against a database of potential matching document thumbprints corresponding to a plurality of documents based on the one more secure dot product matching protocols, the document thumbprints ordered by the remote system based on a probability that corresponding documents will be copied by the client, the thumbprints ordered in the database prior to the remote system's receipt of the transmitted initial secure dot product data; and
    determining whether the response indicates a match for the document.

2. The method of claim 1, further comprising:
    receiving a plurality of responses from the remote system;
    generating secure dot product results from the responses and the initial secure dot product data;
    determining that one of the responses indicates a match for the document from a secure dot product result; and
    transmitting data to the remote system indicating the one of the responses that resulted in the match.

3. The method of claim 2, wherein the transmitted data includes an index value identifying which response resulted in the match.

4. The method of claim 3, wherein transmission of the index value is to cause the remote system to perform a function based on the index value.

5. The method of claim 4, wherein the function is selected from the group consisting of a billing function, a copyright tracking function, or a data loss prevention function.

6. The method of claim 1, further comprising:
    utilizing the response to compute an estimate indicative of a confidence level for a purported match;
    comparing the confidence level with a threshold, and
    finding the match when the estimate exceeds the threshold.

7. The method of claim 1, wherein the one or more protocols comprise a second secure dot product matching protocol that indicates a reduced number of random parameters that are utilized in generating the initial secure dot product data, wherein the first and second secure dot product matching protocols are transmitted together to the remote system.

8. The method of claim 1, wherein the one or more protocols comprise a third secure dot product matching protocol that indicates a maximum number of responses that are to be generated by the remote system.

9. The method of claim 1, wherein the one or more protocols comprise a fourth secure dot product matching protocol that is to limit responses generated by the remote system to selected potential matches.

10. The method of claim 1, wherein the one or more protocols comprise a fifth secure dot product matching protocol that is to instruct the remote system when responses from the remote system are to be received.

11. The method of claim 1, wherein the document is one of an image generated by a multifunction peripheral device, a digital photograph, or digital image of a fingerprint.

12. The method of claim 1, wherein the potential matching document thumbprints are mixed-media bounding box codes corresponding to one or more visual features extracted from a plurality of potential matching documents, the mixed-media bounding box codes generated by the remote system prior to the remote system's receipt of the transmitted initial secure dot product data.

13. The method of claim 12, wherein a size of a pool of potential matching document thumbprints utilized by the remote system for location of potential matching documents is adjusted by the remote system based on current usage of the remote system.

14. A method comprising:
    receiving, at a remote system, one or more secure dot product matching protocols and initial secure dot product data generated from a document thumbprint of a document from a client system, the initial secure dot product data providing no knowledge of the document, wherein the initial secure dot product data is a secure key computed from one or more mixed-media bounding box codes corresponding to one or more visual features extracted from the document and one or more random parameters generated for a secure dot product process, one or more of the one or more random parameters for document matching adjusted by the one or more secure dot product matching protocols, a first secure dot product matching protocol received by the remote system with the initial secure dot product data selected by the client system to reduce a size of the secure key from an initial size to a reduced size;

generating a response from the received initial secure dot product data and a second document thumbprint of a second document, wherein the response is generated by the remote system against a database of potential matching document thumbprints corresponding to a plurality of documents based on the one more secure dot product matching protocols, the document thumbprints ordered by the remote system based on a probability that corresponding documents will be copied by the client system, the thumbprints ordered in the database prior to the remote system's receipt of the transmitted initial secure dot product data;

transmitting the response to the client system.

15. The method of claim 14, further comprising:

receiving data indicating that the document and the second document are a same document; and performing one or more functions responsive to receiving the data.

16. The method of claim 15, wherein the one or more functions include one or more of document tracking, copyright usage accounting, and data loss prevention.

17. The method of claim 14, further comprising:

waiting a prescribed amount of time without receiving a response from the client system that comprises data indicating a document match; and deleting the received initial secure dot product data.

18. A client system, comprising:

an input to receive a document;

a memory to store the document; and a processor coupled with the memory to execute a secure dot product engine to transmit one or more secure dot product matching protocols and initial secure dot product data generated from a document thumbprint for a document to a remote system, wherein the initial secure dot product data is a secure key computed from one or more mixed-media bounding box codes corresponding to one or more visual features extracted from the document and one or more random parameters generated for a secure dot product process, and wherein the one or more secure dot product matching protocols adjust one or more of the one or more random parameters for document matching, and a first secure dot product matching protocol transmitted to the remote system with the initial secure dot product data is selected by the client system to reduce a size of the secure key from an initial size to a reduced size, receive a response from the remote system, the response generated by the remote system utilizing the initial secure dot product data and without knowledge of the document, the response generated by the remote system against a database of potential matching document thumbprints corresponding to a plurality of documents based on the one more secure dot product matching protocol, the document thumbprints ordered by the remote system based on a probability that corresponding documents will be copied by the client system, the thumbprints ordered in the database prior to the remote system's receipt of the transmitted initial secure dot product data, and determine whether the response indicates a match for the document.

19. The system of claim 18, further comprising:

the processor to execute the secure dot product engine to receive a plurality of responses from the remote system, generate secure dot product results from the responses and the initial secure dot product data, determine that one of the responses indicates a match for the document from a secure dot product result, and transmit data to the remote system indicating the one of the responses that resulted in the match.

20. The system of claim 18, wherein the system is a multifunction peripheral device.

21. A remote system, comprising:

a memory to store a database of document keys; and a processor coupled with the memory to execute a secure dot product engine to receive, at the remote system, one or more secure dot product matching protocols and initial secure dot product data generated from a document thumbprint of a document from a client system, the initial secure dot product data providing no knowledge of the document, one or more parameters for document matching adjusted by the one or more secure dot product matching protocols, a first secure dot product matching protocol received by the remote system with the initial secure dot product data selected by the client system to reduce a size of the secure key from an initial size to a reduced size, generate a response from the received initial secure dot product data and a second document thumbprint of a second document, wherein the response is generated by the remote system against a database of potential matching document thumbprints corresponding to a plurality of documents based on the one more secure dot product matching protocols, the document thumbprints ordered by the remote system based on a probability that corresponding documents will be copied by the client, the thumbprints ordered in the database prior to the remote system's receipt of the transmitted initial secure dot product data, and transmit the response to the client system, wherein the initial secure dot product data is a secure key computed from one or more mixed-media bounding box codes corresponding to one or more visual features extracted from the document and one or more random parameters generated for a secure dot product process.

22. The system of claim 21, further comprising:

the processor to execute the secure dot product engine to receive data indicating that the document and the second document are a same document; and a post-match processor to perform one or more functions responsive to receipt of the data.

23. The system of claim 22, wherein the one or more functions include one or more of document tracking, copyright usage accounting, and data loss prevention.

24. The system of claim 21, further comprising:

the processor to execute the secure dot product engine to wait a prescribed amount of time without receiving a response from the client system that comprises data indicating a document match, and delete the received initial secure dot product data.

* * * * *